(12) United States Patent
Lee et al.

(10) Patent No.: US 6,337,038 B1
(45) Date of Patent: Jan. 8, 2002

(54) PARTICLES OF A WINDOW FOR VARYING THE DEGREE OF LIGHT TRANSMISSION IN PRESENCE OF ELECTRIC FIELD AND USES THEREOF

(75) Inventors: Seung Hwa Lee, Seoul; Do Sung Kim, Taejon, both of (KR)

(73) Assignee: Korea Kumho Petrochemical Co., Ltd., Seoul (KR)

( * ) Notice: Subject to any disclaimer, the term of this patent is extended or adjusted under 35 U.S.C. 154(b) by 0 days.

(21) Appl. No.: 09/418,828

(22) Filed: Oct. 15, 1999

(30) Foreign Application Priority Data

Oct. 16, 1998 (KR) ............................................. 98-43349

(51) Int. Cl.$^7$ .............................. G02F 1/00; G02F 1/11
(52) U.S. Cl. ........................ 252/583; 359/296; 478/38; 546/5
(58) Field of Search ............................ 546/5; 359/296; 252/583

(56) References Cited

U.S. PATENT DOCUMENTS

| | | | | |
|---|---|---|---|---|
| 4,164,365 A | 8/1979 | Saxe | ........................... | 350/362 |
| 4,247,175 A | 1/1981 | Saxe | ........................... | 350/362 |
| 4,407,565 A | 10/1983 | Saxe | ........................... | 350/374 |
| 4,422,963 A | 12/1983 | Thompson et al. | ......... | 252/583 |
| 4,435,047 A | 3/1984 | Fergason | .................... | 350/334 |
| 4,616,903 A | 10/1986 | Fergason | .................... | 350/334 |
| 5,463,491 A | 10/1995 | Check, III | .................. | 359/296 |

*Primary Examiner*—Bernard Dentz

(57) ABSTRACT

Dichronic particles are developed for a window which varies the degree of light transmission at a user's desire, wherein the particles are obtained by reacting metal complexes of a transition metal (Co, Ni, Cu) and picolinic acid with polyiodine, dispersing into the particles an acrylate based polymer resin containing a plasticizer and injecting the particles between two conductive sheets of glass to be used for a window which varies the degree of light transmission in presence of electric field, to thereby improve stability to long exposure, color fastness, anti-clusteration, rapid changes in the degree of light transmission in the cases of absence and presence of electric field or power.

10 Claims, No Drawings

PARTICLES OF A WINDOW FOR VARYING THE DEGREE OF LIGHT TRANSMISSION IN PRESENCE OF ELECTRIC FIELD AND USES THEREOF

BACKGROUND OF THE INVENTION

Field of the Invention

The present invention relates to particles for a window which varies the degree of light transmission depending on presence of an electric field, and more particularly to dichronic particles which show a special directional arrangement in presence of an electric field as one of the methods to satisfy a user's desire with a specific function of regulating light transmission on the window made of those particles, when the window is used as an external decoration material for cars and buildings for varying the degree of light transmission.

There has been developed a variety of techniques on windows which has been used as external decoration material for cars and buildings with the special fuction of providing selectivity of light transmission to meet a user's demand, i.e., the so called "smart window".

There are three methods of producing the smart window. First of all, the most commonly used method is by means of oxidation and reduction of materials. Specifically, electrolytes and materials are injected between the conductive glasses to induce oxidation and reduction reactions. When power is applied to the glass, colors of these materials are changed to regulate the degree of light transmission by controlling the amount of light to be absorbed. Another method is the directional arrangement of particular chemicals in the presence of an electric field. This method is classified into two specific methods: one using directional arrangements of liquid crystals which are made into a film and inserted into the conductive glass; and the other using directional arrangements of dichronic particles.

The aforementioned specific methods will be described in detail. In the first method of making liquid crystals into a film to be inserted between the conductive glass, when the electric field is not applied between the conductive glass, the degree of light refraction can be different at the liquid crystals and polymeric resins to cause birefringence. Therefore, light is refracted in the boundary of the liquid crystals and the macromolecules to generate a semi-transparent state. When power is applied to the semitransparent state of liquid crystals, they are arranged in parallel to the electric field. Therefore, the refractive index of the liquid crystals and that of the macromolecule resin become identical to thereby prohibit generation of birefringence and increase the degree of light transmission.

On the other hand, in the method of using the directional arrangements of dichronic particles, the particles having two directions of light transmission are dispersed between the glass to induce directional arrangements in the presence of an electric field, thereby controlling the degree of light transmission. This method has been developed by Research Frontier Co. for the first time (U.S. Pat. Nos. 4,164,365, 4,247,275, 4,407,565, 4,422,963, 4,435,047, 4,579,423, 4,616,903, 4,657,349, 5,463,491).

In principle, if the electric field is not formed at the glass, the dichronic particles irregularly move to cause diffusion and refraction of light, thereby decreasing the degree of light transmission. If the electric field is applied at the glass, the particles are arranged in a predetermined direction to readily transmit light and increase the degree of light transmission.

The particles of the smart window produced by the Research Frontier are obtained by reaction of polyiodine and an alkaloid, wherein the alkaloid series includes dihydro cinchonidine sulfate, quinine, quinine bi-sulfate (U.S. Pat. No. 4,422,963), and para 2,5 dicarboxyl acid hydroxy quinoline; and the polyiodine series includes cesium iodide, calcium iodide or a resultant produced by reacting potassium iodide and iodine. The light polarizing crystals synthesized by mixing alkaloid and polyiodine vary the amount of light to be transmitted in accordance with directions of incident light. In other words, the light absorption coefficient at one axis of the crystal particles is different from that at the other axis thereof, so that the degree of light transmission becomes different.

The directional arrangement of the particles can be manipulated to meet the user's desire by controlling the total amount of light to be transmitted through the crystals. The particles are dispersed into proper acrylate based macromolecules and phthalate or trimellitate series used as a plasticizer and injected between glass.

When power is not applied, the particles are not arranged in the solution state. Therefore, the light is not to be transmitted but to be scattered through the solution state of the particles, thereby decreasing the degree of light transmission as in the state of crystals.

When power is applied, the particles are arranged in a predetermined direction, increasing the degree of light transmission.

However, there are problems in the aforementioned method in that the transparency of the solution or film injected between glass layers is lower, that only a mechanical mixing method is used in the dispersion procedure of the particles, that it takes longer to obtain a uniform size of particles, and that the degree of light transmission is different within approximately 30% in the two cases, in absence and presence of power applied to the window which varies the degree of light transmission.

SUMMARY OF THE INVENTION

The present invention is presented to solve the aforementioned problems and it is an object of the present invention to provide a new composition to be used in producing a smart window as an external decoration material for cars and buildings, implementing the selectivity of light transmission, wherein dichronic particles of the window are arranged in predetermined directions in the presence of an electric field, to improve transparency, and the degree of light transmission in the presence of power.

It is another object of the present invention to provide a window made of particles which vary the degree of light transmission.

In order to achieve the objects of the present invention, there are provided particles for a window which varies the degree of light transmission in the presence of an electric field, wherein the particles are obtained by reacting metal complexes of transition metals with ligands containing a nitrogen atom, and polyiodines.

DETAILED DESCRIPTION OF THE INVENTION

The present invention will be described in detail below. As described above, the particles of the present invention are obtained by reacting metal complexes of transition metals and ligands containing a nitrogen atom, and polyiodines. The particles are dispersed to form a solution or a film, and then injected or interposed between conductive glass to produce a window which varies the degree of light transmission in the presence of an electric field.

The particles of the present invention show physical properties as follows: first of all, the crystal particles show a difference in the degree of light transmission at both axial directions of the crystal particle; secondly, the particles are uniform in the size and less than 1 μm in dispersion; thirdly, the dispersed particles are able to remain in a homogeneous and stable whether as a solution or a film, without any modifications caused by light, reactions with other materials, and so on, even if iodine is added in the production procedures. Finally, there is an affinity between a dispersion of macromolecules with particular functional groups and the particles, even if the dispersion macromolecules are used for preventing clusteration of the particles.

At this time, the particles are the result of reacting complex chemicals and polyiodines.

In producing the particles of the present invention, a transition metal atom can be selectively taken among nickel acetate tetrahydrate, cobalt acetate tetrahydrate, copper acetate hydrate and nickel chloride hydrate as a starting material in the synthesis of complex chemicals. Picolinic acid can be chosen as a ligand because it contains functional groups of nitrogen atom and carboxylic acid to produce a complex chemical in reaction with transition metal. This ligand and the aforementioned transition metal with oxidation number 2 are sequentially combined into nickel picolate, cobalt picolate and copper picolate.

Next, polyiodine is synthesized to react with the complex chemicals by reacting an alkali iodide and iodine.

At this time, the alkali iodide can be chosen among potassium iodide, calcium iodide, and lithium iodide. The alkali iodide is melt in the solvent mixed with water and ethanol (1:10) and react with iodine at the molar ratio of 1:2.

The polyiodine solution obtained in the aforementioned method is mixed with the complex chemicals at the ratio of 1:2. At this time, the mixture turns dark blue. The mixed solution is filtered with a 0.2 μm filter. Then, the resultant dark blue powder particles are used in the smart window for varying the degree of light transmission in accordance with the present invention. The Raman spectrum shows a peak at 143 cm$^{-1}$, revealing the penta-iodine structure of iodine contained in the particles.

On the other hand, as in the conventional method of producing windows which vary the degree of light transmission, the particles obtained in the aforementioned method are dispersed in an acrylate based macromolecular resin containing a plasticizer and injected between the conductive glasses.

A preferred embodiment of the present invention will be described as a method of producing a smart window. First of all, a plasticizer is melted in the polymer resin, into which the particles are dispersed. To synthesize the polymer resin, tert-butyl acrylate or neo-pentyl alcohol and acrylochloride of acrylate based substances are used to make neopentyl acrylate monomer. Then, the resulting polyneopentyl acrylate is used as the dispersion polymer.

Another preferred embodiment of the dispersion material produced in accordance with the present invention is the polymerization of the interpolymerized material obtained by acrylic acid and ethylmethacrylate. The average molecular weight of the radical-polymerized macromolecules should be about 3,000, 10,000, 15,000, 20,000, 30,000 and the dispersity thereof should be between 1.7 and 2.0. Then, the macromolecules are melted in the solution containing the plasticizer. If polymers with a molecular weight of 3,000 or 10,000 are left out for a while after dispersion, the precipitation occurs in the solution. On the other hand, if the average molecular weight of the polymers gets larger than 50,000, the dispersion force of the particles decreases. Therefore, an optimum average molecular weight of the particles is about 20,000 and 30,000.

Trioxyl trimethylate or butyloctylphthalate can be used as the plasticizer. Especially, when the phthalate based plasticizer is mixed with an acrylate based dispersion of macromolecules, the transparency of the solution decreases, causing different rates of light refraction in the particles. If a solution type of chemical substance is used for producing a window which varies the degree of light transmission, an optimum ratio of molecular weight between the dispersion of polymer and plasticizer is 1:8.

Besides the aforementioned method of synthesizing particles to be dispersed into the dispersion polymers, there is another method of dispersing the complex chemical substance into the dispersion polymers to be reacted with polyiodines. Specifically, at first, hydroxy acrylate based polymers are melted in an ether or alcoholic solvent and mixed with the complex chemicals. Secondly, the mixture is further mixed with the polyiodine solution and then the chloroform solution is used to remove the polyiodine solution which has not reacted with the complex chemicals. Only the particles dispersed into the hydroxy acrylate polymers are made into pastes, which are then dispersed into the ether or alcohol solution to separately collect only a predetermined size of the particle pastes with a centrifugal separation device.

Then, the particle pastes are dispersed into the dispersion polymers containing the plasticizer. In case that a window is produced using the solution type of particles, an optimum ratio of average molecular weight between the plasticizer and the polymers is about 1:8.

The resulting solution is mixed well to form a homogenous solution, injected between the conductive glasses which are tightly sealed to be a final product of the smart window.

The present invention is further described in detail with reference to the following embodiments. However, the scope of the present invention is not restricted in the embodiments which will be described below.

Embodiment 1

When nickel acetate tetrahydrate 2 g is heated and melted in ethyl alcohol, and then mixed with picolinic acid 3 g, the color of the mixture turns green to dark blue. Then, the mixture is left out for 3 hours or so to form a blue precipitate. The precipitate is separated and dried for analyzing and confirming the composition of elements and chemical structure with NMR and mass spectrometry.

The analysis of elements results as follows: C is 48.5%, N 9.32%, H 3.23%. The final molecular weight confirmed in mass analysis is 302. Therefore, it is confirmed in these results that acetate is replaced by picolinic acid, the ligand of nickel.

A 5 g metal complex is added to ethylene glycol ethylether 10 g, and polyhydroxyethylmethacrylate (molecular weight 150,000) 1 g to be further mixed with a solution obtained by reacting potassium iodide 0.16 g and iodine 0.5 g in a solvent mixture of ethanol and water in a ratio of 5:1. The polyhydroxyethylmethacrylate is mixed for about 1 hour and made into a paste by means of chloroform. The paste is dispersed into ethyleneglycol ethylether 10 g and rotated by the centrifuge at 3,200 rpm for 10 minutes. Then, the precipitated portion of the paste is separated to obtain the particles of the present invention. At this time, the chemical structure of polyiodine obtained by reacting polyiodine and metal complex is confirmed with the Raman spectroscopy. The spectrum shows a peak at 143 cm$^{-1}$, which indicates that polyiodine consists of 5 iodine atoms.

Embodiment 2

The same method of producing the particles of the present invention as in the first embodiment is applied with the only difference of replacing nickel acetate with cobalt acetate 2 g.

Embodiment 3

The same method of producing the particles of the present invention as in the first embodiment is applied with the only difference being replacing nickel acetate with nickel chloride hydrate 2 g.

Experiment 1

A dispersion polymer is made by polymerizing acrylic acid and ethyl methacrylate. The polymerized polymer is mixed with a plasticizer, trioxyl trimellitate at the molecular weight ratio of 1:10. The blue paste 2 g produced in embodiment 1 is mixed with 5 g of the dispersion polymer containing the plasticizer. At this time, the dispersion polymer is obtained in a method which will be described as follows: ethyl methacrylate 25 g and acrylic acid 3 g are radical-polymerized by means of AIBN 0.4 g in a solvent mixture of ethyl acetate and benzene. After a 4 hour reaction, the polymer is precipitated by cyclohexane and filtered and dried in a vacuum oven for the final synthesis of the block copolymer of ethyl methacrylate and acrylic acid, when the average molecular weight is 20,000 and the dispersity is 1.8.

Then, the resultant material is mixed for an hour and injected between two conductive sheets of glass. In order to measure the property of the window produced in the aforementioned method, a UV spectrum is obtained at a range of 400–800 nm. The degree of light transmission is measured by the UV spectroscopy, 100 voltage AC power at both electrodes. If power is not applied to the glass, the degree of light transmission measured at wave lengths of 400–800 nm is kept in the range of 20%–25% without any distinctive absorption band.

When 100 voltage AC power is applied to the glass, the degree of light transmission is increased to 60%–65% without any distinctive absorption peak at wave lengths of 400–800 nm. The degree of light transmission can be changed within 1 second in the presence of power.

In addition, to check the stability and dispersion of the substance, it is exposed outdoors for 12 months to measure changes in the degree of light transmission. As a result, the difference in the degree of light transmission is kept at about 40% in cases of the absence and the presence of power.

Experiment 2

Another experiment is carried out in the same way as the first experiment. The only difference is using polyneopentylacrylate with a molecular weight of 25,000 as the dispersion polymer; neopentyl alcohol 20 g and acrylochloride 19 g are reacted in a benzene solvent with the addition of 2–3 drops of pyridine. The substance is separated in the 30 minutes evaporization procedure and its structure is determined with NMR. Then, the substance is polymerized in tetrahydrofuran for about 5 hours by adding AIBN. The solvent is vacuum distilled.

As a result, the average molecular weight of the polymer is about 25,000 and the dispersity thereof is kept at 1.7–2.0.

When power is not applied to the glass, the degree of light transmission is 20–25% at a range of wave lengths of 400–800 nm. When power is applied to the glass, the degree of light transmission increases to 55–58%.

When the stability and dispersity of the substance is examined, no difference in the degree of light transmission for a period of 12 months was found. The dispersity of the substance in this experiment proves superior to the block copolymer of acrylic acid and ethylmethacrylate in experiment 1.

Experiment 3

The third experiment is carried out in the same way as in experiment 1. The only difference herein is using polymerized tert-butylacrylate with a molecular weight of 25,000 as the dispersion polymer. The difference in the degree of light transmission is kept at about 30–35% in the cases of absence and presence of power. There has been no distinctive difference in the color of particles even if they are left outdoors for a long period of time.

As described above, new particles are produced with complex chemical substances to be used for an external decoration material, ie., window of cars and buildings, to implement light transmission selectivity with the arrangement of dichronic particles in presence of the electric field, to thereby improve transparency of the window, and to change the degree of transmission in the presence of power.

What is claimed is:

1. A composition for use in varying the degree of light transmission in the presence of an electric field, said composition comprising particles obtained by reacting metal complexes of transition metals with ligands containing a nitrogen atom, and iodines.

2. The composition of claim 1 in the form of a solution.

3. The composition of claim 1 in the form of a film.

4. The composition of claim 1 wherein the transition metal is selected from the group consisting of nickel (II), cobalt (II) and copper (II).

5. The composition of claim 1, wherein the transition metal complex is selected from the group consisting of nickel acetate tetrahydrate, cobalt acetate tetrahydrate, copper acetate hydrate and nickel chloride hydrate.

6. The composition of claim 1, wherein the ligand is picolinic acid.

7. The composition of claim 1, wherein the iodine is a polyiodine which is the reaction product of an alkali iodide and iodine.

8. The composition of claim 7, wherein the alkali iodide is selected from the group consisting of potassium iodide, calcium iodide and lithium iodide.

9. The composition of claim 1 further disposed in an acrylate-based polymeric resin containing a plasticizer.

10. A window which varies the degree of light transmission in an electric field, said window containing a composition comprising particles obtained by reacting metal complexes of transition metals with ligands containing a nitrogen atom, and iodines.

* * * * *